US006337558B2

(12) United States Patent
Yuen et al.

(10) Patent No.: US 6,337,558 B2
(45) Date of Patent: Jan. 8, 2002

(54) MULTI-PURPOSE CHARGING DEVICE FOR BATTERIES

(75) Inventors: Kwok Yin Yuen, Shatin; Pui Wah Vincent Ip, Yuen Long; Andy Wong, Kingswood Village, all of (HK); Kim Murmann, Turku (FI)

(73) Assignee: Nokia Mobile Phones Ltd., Espoo (FI)

( * ) Notice: Subject to any disclaimer, the term of this patent is extended or adjusted under 35 U.S.C. 154(b) by 0 days.

(21) Appl. No.: 09/783,200

(22) Filed: Feb. 14, 2001

(30) Foreign Application Priority Data

Feb. 18, 2000 (FI) .............................................. 20000377

(51) Int. Cl.[7] ................................................. H02J 7/00
(52) U.S. Cl. ....................................... 320/113; 320/107
(58) Field of Search ................................ 320/113, 107, 320/112, 114, 115; 429/96, 97, 98, 99, 100

(56) References Cited

U.S. PATENT DOCUMENTS

| 4,816,735 A | 3/1989 | Cook et al. ................. 320/110 |
| 4,963,812 A | 10/1990 | Mischenko et al. ......... 320/110 |
| 5,059,885 A | 10/1991 | Weiss et al. ................ 320/115 |
| 5,245,266 A | 9/1993 | Yuen ........................... 320/110 |
| 5,256,954 A | * 10/1993 | Chen ........................... 320/110 |
| 5,287,052 A | 2/1994 | Wang .......................... 320/110 |
| 5,357,185 A | 10/1994 | Chen ........................... 320/110 |
| 5,686,810 A | * 11/1997 | Yasui .......................... 320/113 |
| 5,742,149 A | 4/1998 | Simpson ..................... 320/113 |
| 5,818,197 A | 10/1998 | Miller et al. ................. 320/107 |
| 5,933,330 A | * 8/1999 | Beutler et al. .............. 320/114 |
| 6,190,795 B1 | * 2/2001 | Daley .......................... 429/100 |

OTHER PUBLICATIONS

English translation of the Abstract of Japanese Patent document No. JP 5144477.

* cited by examiner

*Primary Examiner*—Peter S. Wong
*Assistant Examiner*—Lawrence Luk
(74) *Attorney, Agent, or Firm*—Perman & Green, LLP

(57) ABSTRACT

The invention relates to a charging device (10) for the batteries of a cellular telephone, whereby the same device can be used to charge batteries (15) with different external dimensions. The charging device (10) comprises width controllers (19a, 19b), the position of which controls the location and position of the actual battery guides (18a, 18b), which enable batteries of different sizes to get a reliable contact with the electrical connectors (17) of the charging device. Short batteries are locked to the charging device by means of a separate stopper (14).

10 Claims, 3 Drawing Sheets

MULTI-PURPOSE CHARGING DEVICE FOR BATTERIES

BACKGROUND OF THE INVENTION

1. Field of the Invention

"The invention relates to a charging device for batteries, which comprises the body of the charging device, which body includes an upper part and a bottom part, electrical connectors for charging the batteries and battery guides for guiding the batteries to be charged to electrical connectors".

2. Description of the Prior Art

There are already millions of mobile stations of different cellular networks in use. The use of mobile stations has increased in an explosive scale both in the number of users and the time used by each user. When the use increases, the duration of batteries is in a way critical. New applications are also coming into use, such as the GPRS (General Packet Radio Service) and UTMS (Universal Mobile Telecommunication System), in which the amount of information to be transferred increases substantially. In order to maintain the good quality of data transfer, the power of the transmitter of a cellular telephone must be increased in adverse conditions. The increase of power exhausts the battery of a cellular telephone rapidly. So the user may need at least one spare battery in addition to the battery in the cellular telephone for changing it to the telephone in a situation that the battery in the cellular telephone gives a notification that it is running out of charge. The exhausted battery should then be charged quickly and easily with a suitable device.

Because one device manufacturer may have tens of different telephone models with different batteries of different sizes, and several battery models may be suitable for the same cellular telephone, the users must acquire a separate charging device for each type of battery. The charging device of one battery type may in some cases be suitable for another type, too, but generally this is not possible with the prior art charging devices. In practice, the prior art operation is difficult and expensive for the user.

SUMMARY OF THE INVENTION

It is an object of this invention to provide a new kind of a charging device for the batteries of cellular telephones, which charging device can be used for batteries of different width, length and thickness.

The objectives of the invention are achieved with a battery charging device, in which mechanical adjusters allow the attachment of batteries of different width, length and thickness on the electrical connectors of the charging device for performing the charging.

Preferred embodiments of the invention are described in the dependent claims.

The basic idea of the invention is the following: The electrical connectors needed for charging the batteries are at the first end of the charging device. The battery guides on the sides of the connectors of the charging device make sure that the connectors of the battery meet the right connectors in the device. The width of the battery to be placed in the charging device influences the width controllers on both sides of the charging device, and the mechanical solution in connection with the width controllers influences the width of the battery guides on the sides of the electrical connectors of the battery charger. With this method, batteries of different sizes are automatically guided in the right place in the charging device, when they are placed in it. In the longitudinal direction, a stopper has been arranged for batteries of different sizes close to the second end of the charging device to keep the battery in place during charging. After charging, the stopper can be pushed to the bottom of the charging device, whereby the battery can be removed from the device. The thickness of batteries to be charged in the charging device can vary, because the thickness of batteries is not restricted by the electric connectors, battery guides or width controllers of the charging device.

The invention provides the advantage that the same charging device can be used for batteries with different width, length and thickness.

In addition, the invention provides the advantage that the mechanism of the charging device guides the battery to be charged to the electrical contacts automatically and reliably.

Furthermore, the invention has the advantage that its manufacturing costs are low.

DESCRIPTION OF THE DRAWINGS

In the following, the invention will be described in more detail with reference to the accompanying drawings, in which.

DESCRIPTION OF PREFERRED EMBODIMENTS

Figure 1A:
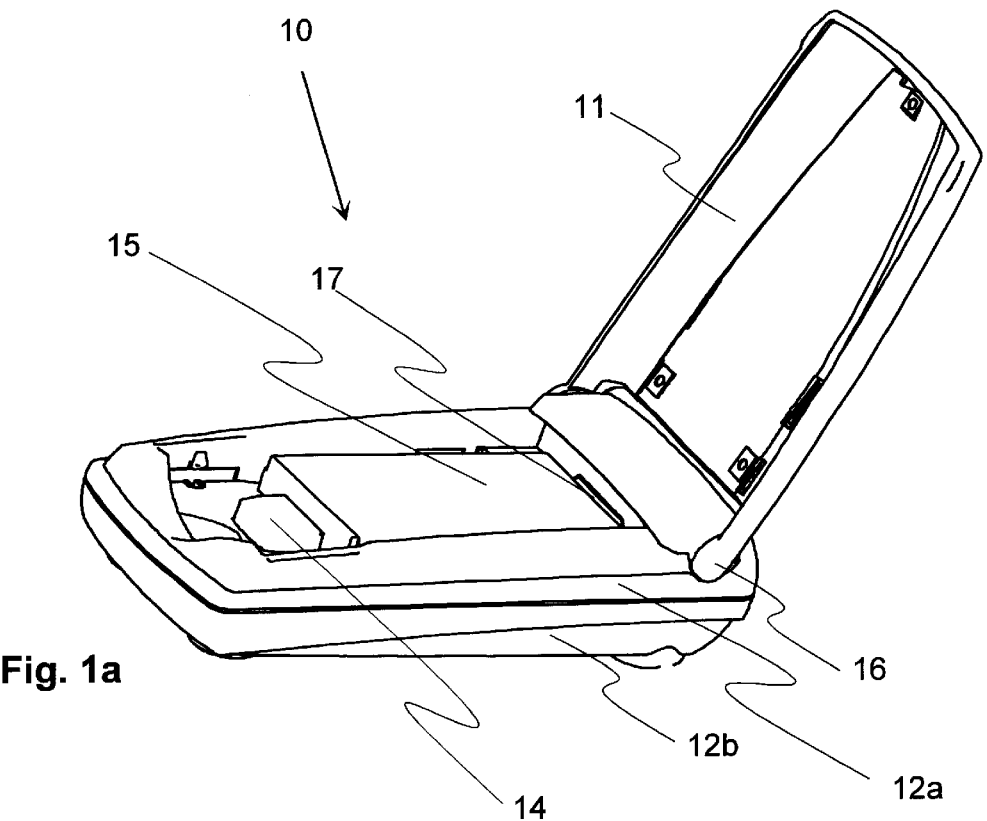
FIG. 1a is an exemplary perspective drawing of a charging device according to the invention.

FIG. 1a shows an example of a charging device 10 according to the invention. The charging device preferably comprises a cover 1, which is articulated to the device with two hinges 16 at the first end of the charging device. The second end of the charging device 10 is open in a way that the battery 15 to be charged can be easily placed in the device. The cover 11 can be closed for the duration of charging, and for its part it ensures that the battery 15 to be charged stays in the charging device 10. The body of the charging device 10 consists of two parts: the bottom part 12b and the upper part 12a, which are preferably made of plastic by injection moulding. The upper part 12a and the bottom part 12b can preferably be connected to each other with fast clips shaped for the parts, by gluing or by some mechanical connecting means. FIG. 1a also shows an example of the electrical connectors 17 of the charging device 10, which connectors are of elastic construction so that they spring against the battery connectors and thus ensure a good contact. The number of connectors 17 is two or more, preferably four, and they are located close to the first end of the charging device 10. FIG. 1a also shows a stopper 14, which is needed when the charging device is used to charge a battery 15, which is short as compared to the total length of the charging device 10.

Figure 1B:
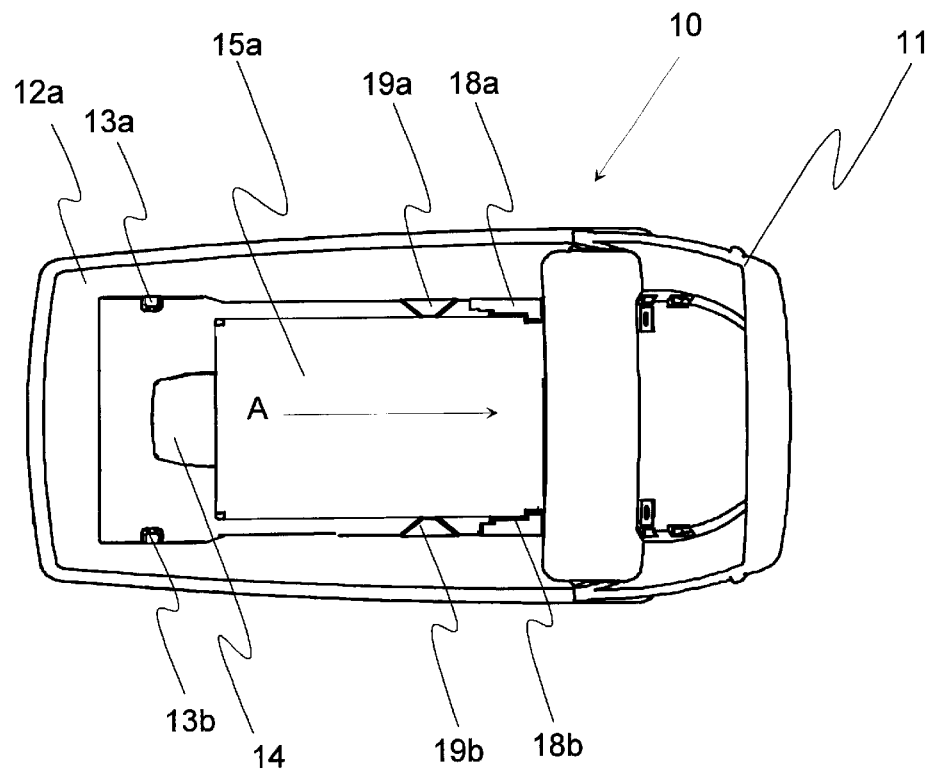
FIG. 1b shows a charging device according to the invention from above, when a short and narrow battery has been connected to it for charging.

FIG. 1b shows an example of a situation in which the charging device is used to charge a battery 15a, which is short as compared to the length of the charging device and narrow as compared to the width of the charging device. The battery 15a to be charged is placed in the charging device by pushing it in the direction of the arrow A towards the first end of the charging device 10. When the battery 15a is placed in the charging device, it meets two width controllers 19a, 19b. The shape of these width controllers is preferably a triangle with a cut apex. The width controllers are partly located in the body of the charging device, in a space delimited by the upper part 12a and the bottom part 12b so that only the peaks of the width controllers are visible on the sides of the space reserved for the battery 15a.

Figure 2:
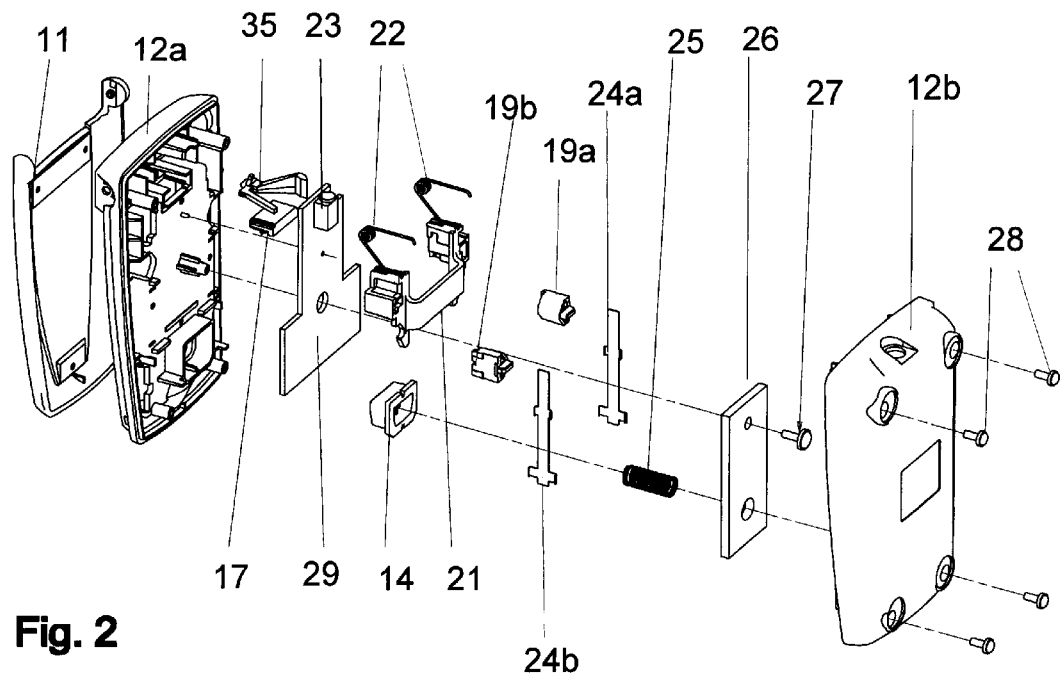
FIG. 2 shows the structural parts of a charging device according to the invention as an exploded view.

The location of the width controllers 19a, 19b in the transverse direction is determined by means of leaf springs 24a, 24b connected to them. The leaf springs, which are shown in FIG. 2, are entirely located in the body of the charging device in the space between the upper part 12a and the bottom part 12b. The leaf springs are fastened at the first end to the upper part 12a and at the second end to the base of the width controllers. The wider the battery to be placed in the charging device is, the more the leaf springs 24a, 24b fastened to the width controllers 19a, 19b bend towards the outer edge of the charging device 10. As a result of this, the distance between the width controllers 19a, 19b becomes large enough to allow the battery 15a to slip between them.

In the next step, the battery 15a presses against the battery guides 18a, 18b, which are located near the first end of the charging device 10, at both edges of the space reserved for the battery. The battery guides comprise, on the edges facing each other, guiding surfaces, which form a step-like pattern in the transverse direction of the charging device 10. This enables placing batteries of different width at the right point against the electrical connectors 17 of the charging device. The battery guides 18a, 18b are fixed parts of the slide 21 shown in FIG. 2. The slide is located in the body of the charging device, whereby only the battery guides 18a, 18b are outwardly visible. The slide is not fastened to the charging device as fixed, but it can move in the body in the direction of the longitudinal axis of the body within certain limits. The slide is connected with two coil springs 22 in the body, the coil springs are essentially V-shaped, and they impose a force on the slide pushing it away from the first end 21 of the charging device when there is no battery to be charged in the charging device.

The width controllers 19a, 19b function as locking devices, which determine how the slide 21 and the battery guides 18a, 18b on it can move towards the first end of the charging device 10. When there is a narrow battery in the charging device, the sides of the battery do not reach to push the width controllers 19a, 19b sufficiently towards the outer edges of the charging device. Then the width controllers lock the slide 21 in place, whereby the slide and the battery guides 18a, 18b cannot move in the direction of arrow A towards the first end of the charging device. Thus the head of the battery to be charged is located in the narrowest gap formed by the closest guiding surfaces of the battery guides, whereby the gap guides the connectors at the end of the battery against the connectors of the charging device 17.

If a wide battery is placed in the charging device, its sides pushing the width controllers 19a, 19b sufficiently far away from each other, the locking, which prevents the movement of the slide 21, is released. Then the slide 21 can move the maximum distance in the direction of the arrow A towards the first end of the charging device 10, which is the situation in the example of FIG. 1c. Only the furthest guiding surfaces of the battery guides 18a, 18b are then visible, while the inner guiding surfaces are pushed into the body of the charging device. Now the head of the battery to be charged is located in the widest gap formed by the furthest guiding surfaces of the battery guides, and the connectors at the end of the battery are again placed accurately against the connectors 17 of the charging device.

A short battery 15a is locked in place by a stopper 14 moving up and down. When the battery 15a is pushed towards the electrical connectors 17 of the charging device 10, the stopper 14 is pushed into the body of the charging device. When the battery 15a is in place, the spring 25 pushes the stopper 14 forth, whereby the battery remains pressed between the stopper and the battery guides 18a, 18b. Thus the battery 15a has been locked in place to remain stationary. When the battery 15a is removed, the stopper 14 is pushed to the bottom, whereby the battery 15a can be removed from the device.

Figure 1C:
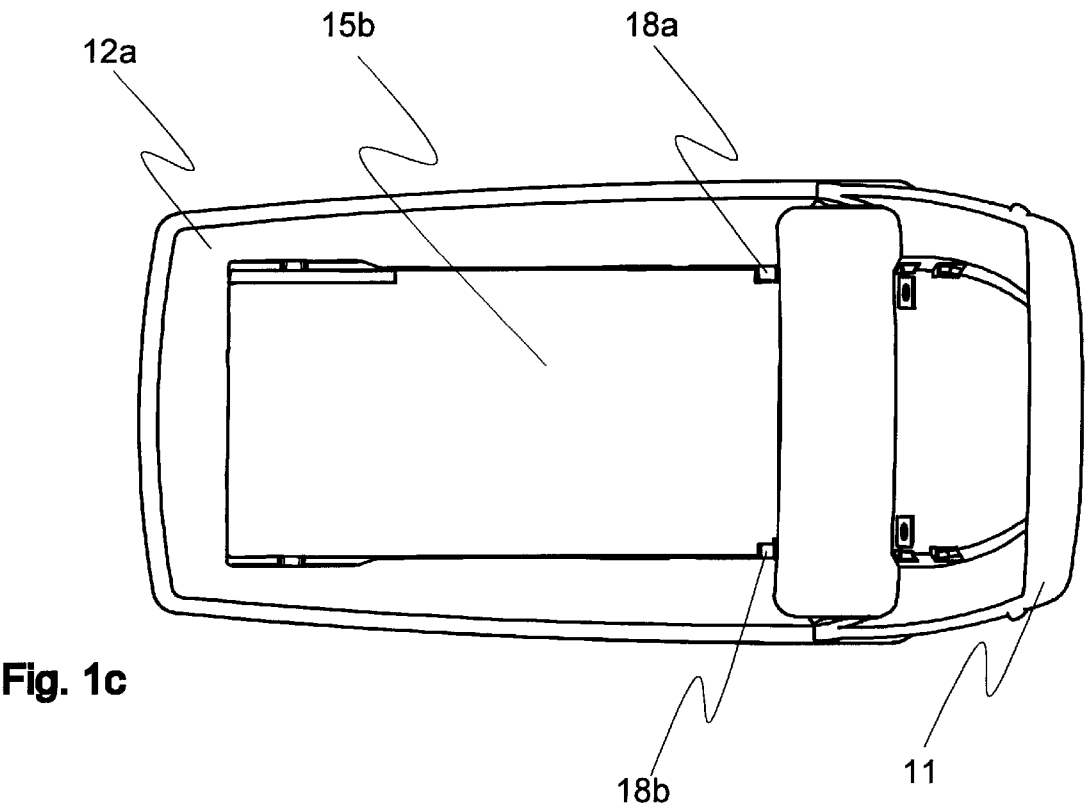
FIG. 1c shows a charging device according to the invention from above, when a long and wide battery has been connected to it for charging.

In the case shown in FIG. 1c as an example, a battery with external dimensions as large as the charging device 10 can hold has been placed in the charging device 10. The width controllers 19a, 19b are now entirely sunk into the shell parts 12a, 12b, whereby the slide 21 and its battery guides 18a, 18b have been able to move to the extreme position towards the first end of the charging device as pushed by the battery to be placed in the charging device. The stopper 14 has been pushed by the battery 15b into the inner space formed by the shell parts 12a, 12b. At the second end of the charging device 10, the battery 15b to be charged is supported at the side by the auxiliary guides 13a, 13b. Because the battery thus fills up the space reserved for the battery, it cannot move in the charging device but stays in place reliably. The battery is removed from the charging device 10 by lifting it at first up with fingers from the second end of the charging device. After this, the battery 15b can be lifted off the charging device. The stopper 14 comes up again and the battery guides 18a, 18b return from the force of the springs 22 to the starting position as far from the first end of the charging device 10 as possible.

FIG. 2 shows the parts of a charging device according to the invention as an exploded view. The largest single parts that are outwardly visible are the cover 11, the bottom part 12b and the upper part 12a. The rest of the parts of the charging device remain either entirely or partly invisible in the space between the bottom part and the upper part. The charging device 10 comprises a circuit board 29, which resembles a letter T upside down in FIG. 2, to which connectors 17 for the batteries, a connector 23 of the electrical connector of the charging device and the charging light indicator 35 are connected. The slide 21 is arranged to move on the narrow part of the circuit board 29. The slide 21 is connected with two V-shaped coil springs 22, which tend to return the slide to a position, which is as far as possible from the first end of the charging device 10. The charging device comprises two leaf springs 24a, 24b, which are fastened from their first end to the opposite sides of the outer edges of the upper part 12a, and to the second end of which width controllers 19a, 19b are fastened. A coil spring 24 is placed inside the stopper 14. The stopper 14 and the circuit board 29 are preferably fastened by means of a board 26 and a screw 27 connected to it to the upper part 12a. The board 26 is preferably made of heavy material, such as metal, so as to balance and stabilize the charging device 10. The bottom part 12b is connected to the upper part 12a preferably with screws. Four screws are used in the example shown in the drawing.

Figure 3A:
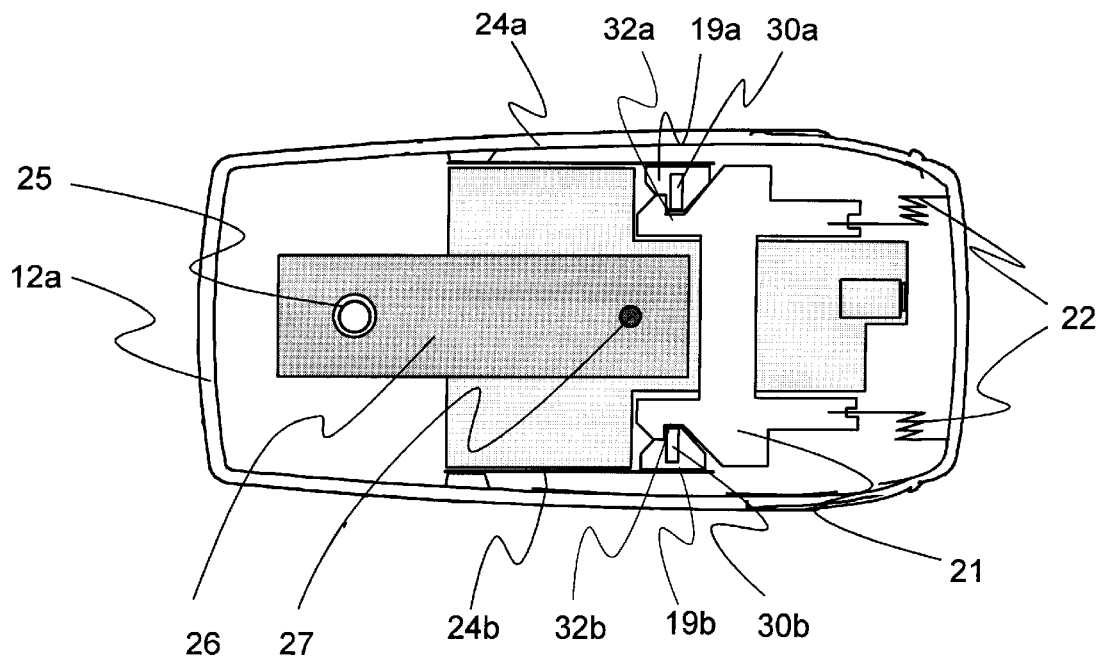
FIG. 3a is an exemplary view of a charging device according to the invention from the bottom, when there i s no battery to be charged in the charging device, or the battery to be charged is narrow.
Figure 3B:
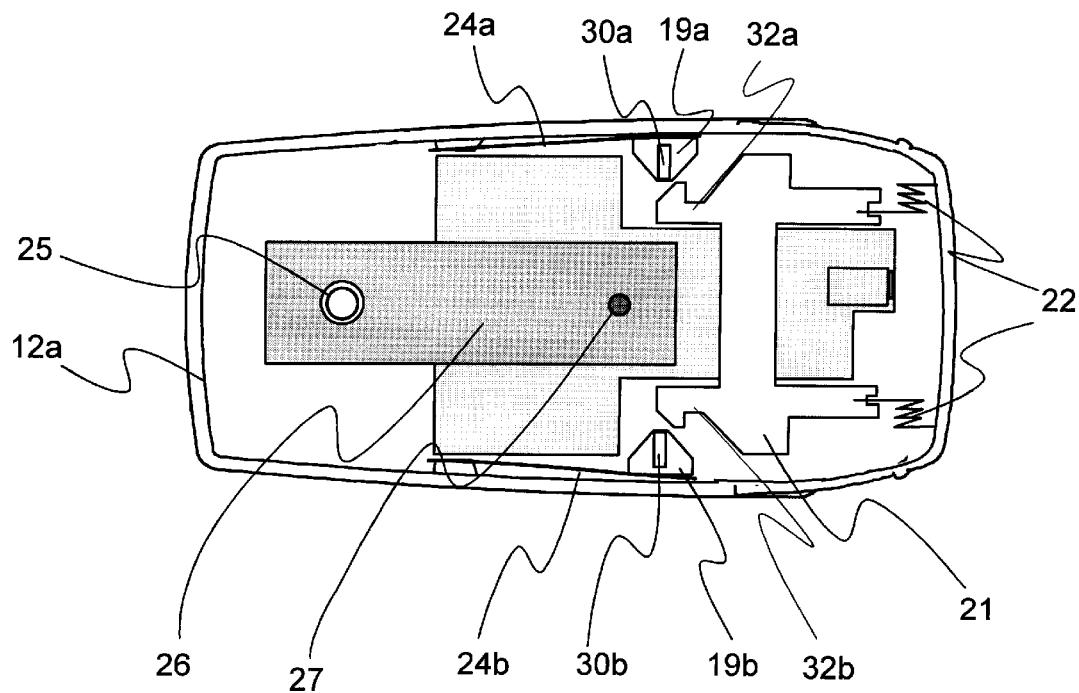
FIG. 3b is an exemplary view of a charging device according to the invention from the bottom, when there is a wide battery to be charged in the charging device.

FIGS. 3a and 3b show an example of a charging device according to the invention as seen from the bottom, when the bottom part has been removed. FIGS. 3a and 3b thus show the inner part of the body of the charging device, which is normally hidden. The purpose of the drawings is to illustrate how the movement of the slide 21 is adjusted by means of the width controllers 19a, 19b.

FIG. 3a shows a situation in which there is either no battery in the charging device or the battery in the device is so narrow that its sides do not push the width controllers sufficiently to the direction of the outer edges of the charging device. In this situation, the leaf springs 24a, 24b push the width controllers 19a, 19b towards each other, whereby the claws 30a, 30b in the width controllers are pushed into the dents 32a, 32b on the sides of the slide and thus prevent the movement of the slide towards the first end of the charging device.

FIG. 3b shows a situation in which there is a wide battery in the charging device, pushing the width controllers 19a, 19b away from each other. Then the claws 30a, 30b move off the dents 32a, 32b and the slide can move towards the first end of the charging device as pushed by the battery. FIG. 3b shows a situation in which the slide has moved to its extreme position at the first end of the charging device. FIGS. 3a and 3b also show the coil springs 22, the force of which pushes the slide continuously away from the first end of the charging device. When the battery has been removed, the slide 21 and the width controllers 19a, 19b are moved back to the position shown in FIG. 3a, as forced by the coil springs 22 and the leaf springs 24a, 24b.

Due to the invention, the same charging device according to the invention can conveniently be used to charge batteries with the following external dimensions: the width of the battery is preferably between 33 and 29 mm, and the length can be between 53 and 72 mm.

Some preferred embodiments of the invention have been described above. However, the invention is not limited to the solutions described above. For example, one stopper was mentioned in the preferred embodiment, but more stoppers can be provided to prevent the longitudinal movement of the batteries, whereby it is possible to charge batteries of very different lengths with the same device. In addition, the inventive idea can be applied in many different ways within the scope defined by the attached claims.

What is claimed is:

1. A charging device for batteries, which comprises a body of the charging device, the body including an upper part and a bottom part, electrical connectors for charging the batteries and battery guides for guiding the batteries to be charged to the electrical connectors, wherein the charging device further comprises width controllers, arranged to adapt automatically the distance between guiding surfaces of the battery guides to correspond to the width required by the battery to be charged, the automatic adjustment of the width being made by the device itself.

2. A charging device according to claim 1, wherein there are two leaf springs positioned in the upper part of the charging device for pushing said width controllers against said battery to be charged.

3. A charging device according to claim 1, wherein said width controllers are shaped as triangles with a cut apex, which is arranged to rest against the side of said battery to be charged.

4. A charging device according to claim 1, wherein said battery guides are a fixed part of a slide, which is arranged as moving.

5. A charging device according to claim 1, wherein said width controllers have claws for locking a slide and said battery guides of the slide in place.

6. A charging device according to claim 4, wherein said slide comprises two V-shaped coil springs for moving said slide away from a first end of said charging device.

7. A charging device according to claim 1, wherein further comprising at least one stopper for fastening said battery to said charging device when the stopper is in an upper position.

8. A charging device according to claim 7, wherein said stopper also comprises a spring for controlling the movement of said stopper.

9. A charging device according to claim 1, wherein said device also comprises a closeable cover, which is articulated to an upper part.

10. A charging device according to claim 1, wherein said batteries to be charged with said charging device are batteries of a cellular telephone.

* * * * *